(12) United States Patent
Miyamoto

(10) Patent No.: US 6,390,710 B1
(45) Date of Patent: May 21, 2002

(54) AQUEOUS GEL INK-FILLED BALL POINT PEN

(75) Inventor: Masaru Miyamoto, Kanagawa (JP)

(73) Assignee: Mitsubishi Pencil Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/947,191

(22) Filed: Sep. 5, 2001

Related U.S. Application Data

(63) Continuation-in-part of application No. 09/521,492, filed on Mar. 9, 2000.

(51) Int. Cl.$^7$ .............................................. C09D 11/18

(52) U.S. Cl. ...................... 401/215; 401/209; 106/31.6

(58) Field of Search ................................. 401/209, 216, 401/215; 106/31.28, 31.6

(56) References Cited

U.S. PATENT DOCUMENTS

| | | | |
|---|---|---|---|
| 4,471,079 A | 9/1984 | Enami | 401/209 |
| 5,609,432 A | 3/1997 | Yamamoto et al. | 401/209 |
| 5,785,746 A | 7/1998 | Kito et al. | 401/209 |
| 5,899,625 A | 5/1999 | Ando et al. | 401/209 |
| 5,951,188 A | 9/1999 | Loftin | 401/209 |
| 5,993,098 A | 11/1999 | Osada | 401/209 |
| 6,056,463 A | 5/2000 | Nishio et al. | 401/209 |

Primary Examiner—Charles R. Eloshway
(74) Attorney, Agent, or Firm—Darby & Darby

(57) ABSTRACT

Provided is an aqueous gel ink-filled ball point pen having less blobbing and capable of drawing stable lines having vivid color and no uneven written intensity. The aqueous gel ink-filled ball point pen has a ball of a diameter of 0.6 to 2.0 mm at a tip point with an aqueous gel ink containing a pigment whose specific gravity is 2 or more and having a viscosity ratio (a value of (viscosity at 10 rpm)/(viscosity at 50 rpm) measured by means of an E type rotational viscometer) of 3.0 to 5.0, and an ink lay down value according to JIS Standard S6053 which is controlled to 220 to 800 mg/m.

1 Claim, 1 Drawing Sheet

AQUEOUS GEL INK-FILLED BALL POINT PEN

This is a continuation-in-part, of application Ser. No. 09/521,492, filed Mar. 9, 2000. This prior application is hereby incorporated herein by reference, in its entirety.

BACKGROUND OF THE INVENTION

1. Field of the Invention

The present invention is directed to aqueous gel ink-filled ball point pens, more specifically to ball point pens having a ball of a diameter of 0.6 mm to 2.0 mm, and filled with an ink containing a special colorant whose specific gravity is 2 or more and has properties expressed by pseudo-plasticity, non-Newtonian viscosity or shear thinning viscosity.

2. Description of the Prior Art

A ball point pen is composed of a pen tip comprising a ball and a tip holder, an ink reservoir and a barrel. In writing with a ball point pen, the ink flowing out of the inside of the tip with rotation of the ball is transferred on or penetrated into a recording material such as paper, whereby letters and lines are written.

One advantage of aqueous ink-filled ball point pens is that the pens use inks having a low viscosity of several mPa's, and therefore can write at a low writing pressure and impart a good writing feeling. However, one defect of aqueous ink-filled ball point pens is a natural outflow of the ink from the point of the tip, a so-called "point seepage" (hereinafter called a direct flow phenomenon) or a back-leaking phenomenon in which air flows in from the tip of the ball point pen to allow the ink to flow out from the ink reservoir. Ink absorbers comprising a bundle of fibers are used to prevent these phenomena.

Another problem with aqueous gel ink-filled ball point pens is that if the ball point pen is left in a cap-off condition, the solvent is dried up because of the high vapor pressure of the solvent, and therefore the pen point is dried to prevent the ink from flowing out. As a result, the ball point pen becomes incapable of writing.

On the other hand, a conventionally known oil based ink-filled ball point pen uses an ink having a high viscosity of several thousand mPa's and therefore has the defect that the ball receives large resistance in rotating when the ink flow out of the pen tip, resulting in an unfavorable writing feeling. Further, if less amount of ink flows out of the tip in writing there is a blobbing phenomenon, unevenness on drawn lines, weak line intensity, and a high writing pressure is required.

One method of improving oil based ink-filled ball point pen, is to use a ball point pen for an aqueous ink having a so-called medium viscosity, which falls within a middle viscosity region (several mPa's to several thousand mPa's) ranging between the viscosities of an aqueous ink and an oil based ink. This is a ball point pen using a relatively low viscosity aqueous ink having the characteristic that the viscosity of the ink is lowered by the rotation of the ball point to allow the ink to flow out smoothly, a so-called shear thinning viscosity.

Inks of this type are known as "gel inks", and the property thereof is shown by expression such as pseudo-plasticity, non-Newtonian viscosity and the like. However, if the ink has too strong a gel property, pigments in the ink coagulate and the flowability of the ink becomes inferior, so that outflow of the ink from the pen point is deteriorated in writing, and starving and inferior writing result. On the other hand, if gelation is weak and the viscosity is low, pigments in the ink are likely to be settled and that the ink is liable to bring about back flow or direct flow.

Further, with gel inks there is a possibility that a special pigment whose specific gravity is large can be used, although such a special pigment was not able to be used for conventional low-viscosity water based inks for a ball point pen. However, the strength of gel has to be increased when a pigment having a large specific gravity is used. Accordingly, at present, ink stability, writing feeling, back flow and direct flow phenomena, and pen structure exert influence on each other, so that an ideal aqueous gel ink-filled ball point pen has not yet been obtained.

SUMMARY OF THE INVENTION

An object of the present invention is to solve the problems described above and provide a ball point pen having less blobbing and capable of drawing stable lines having vivid color and no uneven intensity, wherein the ball point is filled with an ink using a pigment having a large specific gravity.

Intensive research by the present inventors has resulted in the finding that the problems can be solved by adjusting the relation of the structure of a tip with the strength of gel, and controlling the lay down value of ink, thus coming to complete the aqueous gel ink-filled ball point pen of the present invention.

The aqueous gel ink-filled ball point pen of the present invention is an ordinary ball point pen having a refill comprising a pen tip comprising a ball and a tip holder, an ink reservoir and a coupling for connecting the tip with the reservoir. The lay down value of the ink according to JIS standard S6053 is controlled to 220 to 800 mg/100 m, preferably 220 to 780 mg/100 m, by selecting an ink having a suitable viscosity ratio depending on the diameter of the point of the tip or selecting a suitable tip depending on the viscosity ratio of the gel ink.

That is, the aqueous gel ink-filled ball point pen of the present invention is different from ones obtained by merely charging conventional ball point pens with a conventional gel ink, in which the colorant is a pigment whose specific gravity is small.

DETAILED DESCRIPTION OF THE PREFERRED EMBODIMENT

Figure 1:
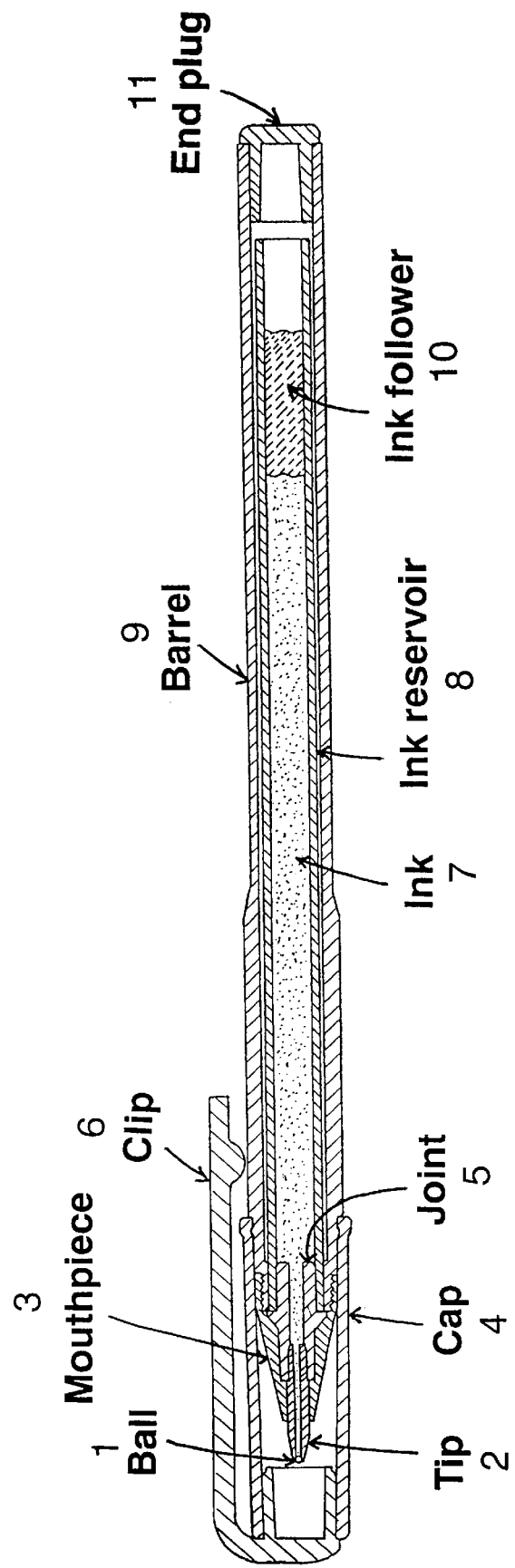
FIG. 1 depicts a ballpoint pen of the type well known in the art, containing a ball 1 and tip 2 housed in a mouthpiece 3. An aqueous gel ink 7 and ink follower 10 are housed in an ink reservoir 8 contained in barrel 9. A cap 4 having a clip 6 is placed over the mouthpiece containing the ball and tip. A joint 5 connects the ink reservoir with the tip. An end plug 11 seals the ink reservoir.

The aqueous gel ink-filled ball point pen of the present invention is obtained by charging a ball point pen having a ball of a diameter of 0.6 to 2.0 mm at the point of the tip with an aqueous gel ink, and controlling an ink lay down value (according to JIS Standard S6053) to 220 to 800 mg/100 m, (preferably 220 to 780 mg/100 m). Exemplary aqueous gel inks may also have an ink lay down value of 380 mg/100 m, 550 mg/100 m or 750 mg/100 m.

The aqueous gel ink of the mention has a viscosity ratio of 3.0 to 5.0, preferably 3.0 to 4.30, wherein the viscosity ratio represents a value of (viscosity at 10 rpm)/(viscosity at 50 rpm) measured by means of an E type rotational viscometer. Exemplary viscosity ratios for aqueous gel inks may also have a ratio of 3.80.

When the viscosity ratio is smaller than 3, the settling of a pigment is likely to occur, and a pigment in accordance with the present invention having a specific gravity of 2 or more settles at the tip of a ball point pen resulting in clogging of the tip, thereby causing poor writing performance. When the viscosity ratio is larger than 5, a gel becomes so strong as to cause poor flowability so that ink can not be supplied from the tip.

The ink lay down value of 220 to 800 mg/100 m shows a characteristic representing the intensity of written lines, wherein the ink lay down value is obtained from a difference between the following two weight values: the weight of the ball point pen measured after writing a line of 400 m on a writing paper by means of a writing tester, and the weight of the ball point pen measured after writing further a line of 100 m.

An ink lay down value of less than 220 mg is too low, and brings about starving due to a reduction in the intensity and inferior ball rotation. On the other hand, an ink lay down value of more than 800 mg is too high, and therefore brings about feathering and blobbing phenomena and delays drying of the drawn lines on hands and clothes. Preferred ranges of ink lay down values are 220 to 780 mg/100 m, or 380 to 780 mg/100 m.

The tip of the aqueous gel ink-filled ball point pen of the present invention has a ball having a diameter of 0.6 to 2.0 mm. The structure and the material of the tip shall not specifically be restricted and are those used for conventional ball point pens. A sintered hard alloy is usually used for a ball material, and ceramics, resins and rubber are included as well. Stainless steel, bronze and German silver are usually used for a holder material, and resin-molded articles can be used as well.

Inks containing colorants, pseudo-plasticizers and aqueous medium components are used as the gel ink for the ball point pen of the present invention.

The aqueous medium component represents water and polar liquid medium other than water and includes, for example, water or water soluble organic solvents. Specific examples thereof include alkylene glycols such as ethylene glycol, triethylene glycol, tetraethylene glycol, dipropylene glycol, 1,2-propanediol, 1,3-propanediol, 1,2-butanediol, 2,3-butanediol, 1,3-butanediol, 1,4-butanediol, 1,2-pentanediol, 1,5-pentanediol, 2,5-hexanediol, 3-methyl-1,3-butanediol and 2-methylpentane-2,4-diol, polyalkylene glycols such as polyethylene glycol and polypropylene glycol, triols such as 3-methylpentane-1,3,5-triol and 1,2,3-hexanetriol, glycerols such as glycerol, diglycerol and triglycerol, lower alkyl ethers of glycols such as ethylene glycol monomethyl ether, ethylene glycol monoethyl ether, diethylene glycol monomethyl ether, diethylene glycol monoethyl ether and diethylene glycol mono-n-butyl ether, thiodiethanol, N-methyl-2-pyrrolidone and 1,3-dimethyl-2-imidazolidinone.

Usually, the content thereof is preferably 10 to 90%, more preferably 30 to 80%, by weight based on the total amount of the ink.

The pseudo-plasticizer includes natural resins such as xanthan gum, tamarind gum, carrageenan gum, tragacanth gum, locust bean gum, gum arabic, guar gum, tara gum, curdlan, pectin, agar, gelatin and mannan which are composed of monosaccharides and polysaccharides such as glucose, mannose, galactose, rhamnose and glucuronates, celluloses such as methyl cellulose, ethyl cellulose and carboxymethyl cellulose, acrylic and urethane synthetic polymers, and inorganic natural or semi-synthetic products such as smectite and montmorillonite.

Pigments used for the colorant shall not specifically be restricted, and optional ones selected from inorganic and organic pigments which have so far conventionally been used for aqueous pigment ink compositions can be used. Pigments whose specific gravity is 2 or more include pigments comprising metal powders or metal foils such as aluminum, bronze, gold, silver and copper, titanium oxide, black titanium oxide, titanium yellow, mica coated with titanium oxide, titanium nitride, iron oxides such as red iron oxide and black iron oxide, cobalt oxide, cobalt blue, molybdenum white, molybdenum red, ultramarine blue, white lead, chrome yellow and vermilion. Any one or a plurality of these pigments can be used according to necessity. A representative example of these pigments is titanium oxide pigment, which has a specific gravity of about 4 and has an excellent covering property, so that an ink containing it can provide lines in which pigments develop their own colors without being affected by the ground color of a recording material (i.e., writing paper).

Aluminum pigment and mica coated with titanium oxide each have a specific gravity of about 3 and exhibit a brightening property. An ink containing them can provide lines which have a metallic tone.

The colorants of the present invention are not only composed of pigments having a specific gravity of 2 or more but may also use colorants whose specific gravity is smaller than 2 according to necessity. The colorants whose specific gravity is smaller than 2 are as follows.

The inorganic pigments include, for example, carbon black, ultramarine, and the organic pigments include, for example, azo lakes, insoluble azo pigments, chelate azo pigments, phthalocyanine pigments, perylene and perinone pigments, anthraquinone pigments, quinacridone pigments, dye lakes, nitro pigments and nitroso pigments.

To be specific, there can be used phthalocyanine blue (C. I. 74160), phthalocyanine green (C. I. 74260), Hansa yellow 3G (C. I. 11670), disazo yellow GR (C. I. 21100), Permanent red 4R (C. I. 12335), Brilliant carmine 6B (C. I. 15850) and quinacridone red (C. I. 46500).

These pigments may be used alone or in combination of two or more kinds thereof. The content thereof is selected usually from a range of 1 to 50% by weight, preferably 5 to 30% by weight based on the weight of the whole ink. When the content of the pigment is less than 1% by weight, the intensity of the drawn lines becomes weak. On the other hand, when it exceeds 50% by weight, the ink becomes unstable as time goes on, and therefore it is not preferred.

Nonionic and anionic surfactants and water soluble polymers are used as a dispersant which is adsorbed on the surface of a pigment particle to disperse the pigment in water. The water soluble polymers are preferably used.

The nonionic surfactants include polyoxyalkylene higher fatty acid esters, higher fatty acid partial esters of polyhydric alcohols and higher fatty acid esters of saccharide. To be specific, they include glycerin fatty acid esters, polyglycerin fatty acid esters, propylene glycol fatty acid esters, pentaerythritol fatty acid esters, polyoxyethylene sorbitan fatty acid esters, polyoxyethylene sorbitol fatty acid esters, polyoxyethylene glycerin fatty acid esters, polyethylene glycol fatty acid esters, polyoxyethylene alkyl ethers, polyoxyethylene phytosterol, polyoxyethylene polyoxypropylene alkyl ethers, polyoxyethylene alkylphenyl ethers, polyoxyethylene castor oil, polyoxyethylene lanolin, polyoxyethylene lanolin alcohols, polyoxyethylene alkylamines, polyoxyethylene fatty acid amides and polyoxyethylene alkylphenyl formaldehyde condensation products.

The anionic surfactants include alkylated sulfonates of higher fatty acid amides and alkylarylsulfonates. To be specific, they include alkylsulfates, polyoxyethylene alkyl ether sulfates, N-acylamino acid salts, N-acylmethyltaurine salts, polyoxyethylene alkyl ether acetates, alkylphosphates and polyoxyethylene alkyl ether phosphates.

The water soluble polymers include polyacrylic acids, acrylic acid copolymers and a maleic acid resin. Useful water soluble polymers are obtained by turning resins such as an acrylic acid resin, a styrene acrylic resin and a styrene maleic acid resin into water soluble salt forms. Sodium and potassium are typical as alkali metals for forming the salts, and typical as amines for forming the salts are aliphatic primary to tertiary amines such as mono-, di- or trimethylamine, alcoholamines such as mono-, di- or tripropanolamine, methylethanolamine, methylpropanolamine and dimethylethanolamine, ammonia, morpholine, and N-methylmorpholine.

The content of the dispersant is 0.5 to 5.0% by weight based on the weight of the ink and 5 to 50% by weight based on the weight of the pigment.

Any water soluble dye of direct dyes, acid dyes, food dyes and basic dyes can be used as a dye of the colorant.

Examples of the direct dyes shall be described below.

C. I. Direct Black 17, ditto 19, ditto 22, ditto 32, ditto 38, ditto 51 and ditto 71, C. I. Direct Yellow 4, ditto 26, ditto 44 and ditto 50, C. I. Direct Red 1, ditto 4, ditto 23, ditto 31, ditto 37, ditto 39, ditto 75, ditto 80, ditto 81, ditto 83, ditto 225, ditto 226 and ditto 227, and C. I. Direct Blue 1, ditto 15, ditto 71, ditto 86, ditto 106 and ditto 119.

Further, examples of the acid dyes shall be described below.

C. I. Acid Black 1, ditto 2, ditto 24, ditto 26, ditto 31, ditto 52, ditto 107, ditto 109, ditto 110, ditto 119 and ditto 154, C. I. Acid Yellow 7, ditto 17, ditto 19, ditto 23, ditto 25, ditto 29, ditto 38, ditto 42, ditto 49, ditto 61, ditto 72, ditto 78, ditto 110, ditto 127, ditto 135, ditto 141 and ditto 142, C. I. Acid Red 8, ditto 9, ditto 14, ditto 18, ditto 26, ditto 27, ditto 35, ditto 37, ditto 51, ditto 52, ditto 57, ditto 82, ditto 87, ditto 92, ditto 94, ditto 111, ditto 129, ditto 131, ditto 138, ditto 186, ditto 249, ditto 254, ditto 265 and ditto 276, C. I. Acid Violet 15 and ditto 17, C. I. Acid Blue 1, ditto 7, ditto 9, ditto 15, ditto 22, ditto 23, ditto 25, ditto 40, ditto 41, ditto 43, ditto 62, ditto 78, ditto 83, ditto 90, ditto 93, ditto 103, ditto 112, ditto 113 and ditto 158, and C. I. Acid Green 3, ditto 9, ditto 16, ditto 25 and ditto 27.

Most of the food dyes are included in the direct dyes or the acid dyes, and one example of what are not included therein includes C. I. Food Yellow 3.

Next, examples of the basic dyes shall be described below.

C. I. Basic Yellow 1, ditto 2 and ditto 21, C. I. Basic Orange 2, ditto 14 and ditto 32, C. I. Basic Red 1, ditto 2, ditto 9 and ditto 14, C. I. Basic Violet 1, ditto 3 and ditto 7, C. I. Basic green 4, C. I. Basic Brown 12, and C. I. Basic Black 2 and ditto 8.

These colorants may each be used alone or in combination of two or more kinds thereof.

Further, lubricants, rust preventives, antiseptics and pH controllers can be used if necessary.

The ink used for the ball point pen of the present invention can be produced, for example, by the following three steps.

1. Preparation of pigment-dispersed material (toner).

A pigment, a dispersant, a solvent, additives and water are sufficiently dispersed by means of a dispersing machine such as a beads mill and a ball mill and then centrifuged to remove coarse matters, whereby a toner is obtained.

2. Preparation of pseudo-plasticizer base (gel base).

A pseudo-plasticizer is gradually added to a prescribed amount of water, and stirring is continued to completely dissolve it in water. Then, a base such as monoethanolamine or triethanolamine is added to control pH to 6 to 9, whereby a gel base is prepared.

3. Preparation of ink.

The gel base and the solvent are weighed and then sufficiently mixed by means of a stirrer.

Then, the toner is added thereto, and further stirring is continued until the gelled matter is homogeneously dissolved, and then foreign matters are removed by a filter, whereby an aqueous gel ink is obtained.

EXAMPLES

The present invention shall be explained in further detail with reference to examples.

The physical properties of the aqueous gel inks used for the ball point pens in the examples and the comparative examples were determined by the following methods.

Viscosity

Measured at a temperature of 25° C. by means of an E type viscometer.

Viscosity Ratio

Viscosities were measured at rotating speeds of 100 rpm and 50 rpm (25° C.) by means of the E type viscometer, and the viscosity ratio was obtained from the following equation:

Viscosity ratio=(viscosity at rotating speed of 10 rpm)/(viscosity at rotating speed of 50 rpm)

Ink Lay Down

The weight ($W_1$) of the ball point pen was measured before writing, and then the weight ($W_2$) of the ball point pen was measured after writing a line of 100 m on writing paper by means of a writing test machine (Minitech). The ink lay down was calculated from the following equation:

Ink lay down=$W_1$-$W_2$

The ball point pens prepared in the examples and the comparative examples were evaluated by the following methods.

Writing Condition

The ball point pens were used for writing by means of a writing test machine, and the flow conditions of the inks were evaluated according to the following criteria:

◎ Particularly good

○ Good

× Starved

Drawn Line Condition

The ball point pens were used for writing by means of a writing test machine, and the drawn line conditions were evaluated according to the following criteria:

◎ Particularly good

○ Good

× Pale

Blobbing Prevention

After writing under the conditions of a speed of 4.5 m/minute, an angle of 600 and a load of 100 g by means of a writing test machine, an ink amount adhered to the tip holder and surplus ink spots fallen during drawing the line were observed and evaluated according to the following criteria:

⊚ Scarcely found

○ Slightly found

Δ Little found

× Much found

Drawn Line Dryability

"Spiral" was drawn on writing paper in an air-conditioned room controlled at a temperature of 25° C. and a humidity of 65%, and after 10 seconds, the spiral was rubbed with a commercial cotton swab to observe and evaluate stain caused by the ink according to the following criteria:

⊚ No stain found and particularly good

○ Little stain found

× Stained

The aqueous gel inks used in the examples and the comparative examples were prepared in the following manner.

Ink A

A gel ink A was prepared with the following composition:

| | |
|---|---|
| Titanium oxide | 20.0 parts by weight |
| Acrylic resin (molecular weight: 10,000) | 2.0 part by weight |
| Aminomethylpropanol | 1.0 part by weight |
| Alkylphosphates | 1.0 part by weight |
| Xanthan gum | 0.4 part by weight |
| Propylene glycol | 15.0 parts by weight |
| Deionized water | 60.6 parts by weight |

An aqueous gel ink having a viscosity ratio of 3.80 was obtained.

Ink B

A gel ink B was prepared in the following composition.

| | |
|---|---|
| Aluminum powder | 10.0 parts by weight |
| Acrylic resin (molecular weight: 5,000) | 1.5 parts by weight |
| Aminomethylpropanol | 0.7 part by weight |
| Alkylphosphates | 1.0 part by weight |
| Carboxymethyl cellulose | 0.6 part by weight |
| Glycerin | 5.0 parts by weight |
| Propylene glycol | 20.0 parts by weight |
| Deionized water | 61.2 parts by weight |

A water base gel ink having a viscosity ratio of 1.40 was obtained.

Ink C

A gel ink C was prepared having the following composition:

| | |
|---|---|
| Titanium oxide | 25.0 parts by weight |
| Acrylic resin (molecular weight: 10,000) | 2.0 parts by weight |
| Triethanolamine | 1.0 part by weight |
| Alkylphosphates | 0.8 part by weight |
| Xanthan gum | 0.6 part by weight |
| Glycerin | 15.0 parts by weight |
| Deionized water | 55.6 parts by weight |

An aqueous gel ink having a viscosity of 4.30 was obtained.

EXAMPLE 1

The holder of a ball point pen ("Signo UM-100" manufactured by Mitsubishi Pencil K.K.) was used to charge a refill comprising a polypropylene-made ink reservoir having an inner diameter of 3.8 mm and a length of 113 mm and a stainless steel-made tip (ball made of a sintered hard alloy and having a diameter of 0.7 mm) with the ink A described above. A follower used for "Signo UM-100" was filled into the ink rear end, whereby an aqueous gel ink-filled ball point pen of the present invention was prepared.

The ink lay down value was 380 mg. The test results of the writing condition, the drawn line condition, the drawn line dryability and blobbing are shown in Table 1.

The test results are shown in Table 1.

EXAMPLE 2

An aqueous gel ink-filled ball point pen was prepared in the same manner as in Example 1, except that a tip comprising a ball made of a sintered hard alloy and having a diameter of 1.0 mm was used.

EXAMPLES 3 AND 4

The holder of a ball point pen ("Signo UM-100" manufactured by Mitsubishi Pencil K.K.) was used to charge a refill comprising a polypropylene-made ink reservoir having an inner diameter of 3.8 mm and a length of 113 mm and a stainless steel-made tip (ball made of a sintered hard alloy and having a diameter of 1.4 or 2.1 mm) with the ink A (Example 3) or ink C (Example 4) respectively. A follower used for "Signo UM-100" was filled into the ink rear end, whereby an aqueous gel ink-filled ball point pen was prepared.

The test results are shown in Table 1.

Comparative Example 1

The holder of the ball point pen ("Signo UM-100" manufactured by Mitsubishi Pencil K.K.) was used to charge a refill comprising a polypropylene-made ink reservoir having an inner diameter of 3.8 mm and a length of 113 mm and a stainless steel-made tip (ball made of a sintered hard alloy and having a diameter of 1.0 mm) with the ink B described above. A follower used for "Signo UM-100" was filled into the ink rear end, whereby an aqueous gel ink-filled ball point pen was prepared.

The test results are shown in Table 1.

Comparative Example 2

An aqueous gel ink-filled ball point pen was prepared in the same manner as in comparative Example 1, except that a tip comprising a ball made of a sintered hard alloy and having a diameter of 0.7 mm was used.

The test results are shown in Table 1.

Comparative Example 3

An aqueous gel ink-filled ball point pen was prepared in the same manner as in Example 1, except that a tip comprising a ball made of a sintered hard alloy and having a diameter of 0.5 mm was used.

The test results are shown in Table 1.

Comparative Example 4

An aqueous gel ink-filled ball point pen was prepared in the same manner as in Example 1, except that a tip comprising a ball made of a sintered hard alloy and having a diameter of 2.1 mm was used.

The test results are shown in Table 1.

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Ink: kind | A | A | A | C | B | B | A | A |
| Ink: viscosity ratio | 3.80 | 3.80 | 3.80 | 4.30 | 1.40 | 1.40 | 3.80 | 3.80 |
| Diameter (mm) of ball in tip | 0.7 | 1.0 | 1.4 | 2.0 | 1.0 | 0.7 | 0.5 | 2.1 |
| Ink lay down value (mg/100 m) | 380 | 550 | 750 | 780 | 446 | 250 | 180 | 900 |
| Writing condition | ⊚ | ○ | ⊚ | ⊚ | X | X | X | X |
| Drawn line condition | ⊚ | ○ | ○ | ○ | X | X | X | X |
| Blobbing | ○ | ⊚ | ○ | Δ | X | X | ○ | X |
| Drawn line dryability | ○ | ⊚ | ○ | ○ | X | X | ○ | X |

Writing condition: ⊚ particularly good; ○ good; X starved
Drawn line condition: ⊚ particularly good; ○ good; X pale
Blobbing: ⊚ scarcely found; ○ slightly found; Δ little found; X much found
Drawn line dryability: ⊚ no stain found and particularly good; ○ little stain found; X stained.

As apparent from Table 1, the lay down value of the ink is controlled to the claimed range by combining an ink having a claimed viscosity ratio with a diameter of the point of the tip, and the ink performances in all the Examples of the invention are good.

What is claimed is:

1. An aqueous gel ink-filled ball point pen which has a ball of a diameter of 0.6 to 2.0 mm at the tip point thereof and is charged with an aqueous gel ink comprising a pigment, said pigment having a specific gravity of 2 or more; said gel ink having a viscosity ratio of 3.0 to 4.30, wherein said viscosity ratio (viscosity at 10 rpm)/(viscosity at 50 rpm) is measured by means of an E type rotational viscometer, and an ink lay down value according to JIS Standard S6053 of from 220 to 780 mg/100 m.

* * * * *